United States Patent [19]
Corbridge

[11] Patent Number: 6,020,720
[45] Date of Patent: Feb. 1, 2000

[54] FAST CHARGING METHOD AND APPARATUS FOR SECONDARY CELLS

[75] Inventor: Mark Corbridge, Buckinghamshire, United Kingdom

[73] Assignee: NEC Corporation, Tokyo, Japan

[21] Appl. No.: 09/173,009

[22] Filed: Oct. 15, 1998

[30] Foreign Application Priority Data

Oct. 16, 1997 [GB] United Kingdom .................. 9721835

[51] Int. Cl.[7] ...................................................... H02J 7/00
[52] U.S. Cl. ............................ 320/139; 320/125; 320/157
[58] Field of Search .................................... 320/139, 157, 320/155, 164, 125

[56] References Cited

U.S. PATENT DOCUMENTS

| | | | |
|---|---|---|---|
| 5,808,447 | 9/1998 | Hagino | 320/139 |
| 5,828,202 | 10/1998 | Tamai | 320/141 |
| 5,831,412 | 11/1998 | Morioka et al. | 320/106 |
| 5,898,294 | 4/1999 | Gold | 320/139 |

FOREIGN PATENT DOCUMENTS

| | | |
|---|---|---|
| 4-125034 | 4/1992 | Japan . |
| 6-138195 | 5/1994 | Japan . |
| 10-023682 | 1/1998 | Japan . |
| 10-304589 | 11/1998 | Japan . |

*Primary Examiner*—Peter S. Wong
*Assistant Examiner*—Gregory N. Toatley, Jr.
*Attorney, Agent, or Firm*—Sughrue, Mion, Zinn, Macpeak & Seas, PLLC

[57] ABSTRACT

A fast charging method and apparatus for secondary cells, especially for lithium ion cells. The charging process has two charging phases. In the first charging phase, a constant current is supplied to the secondary cell from a charging apparatus whilst monitoring the output voltage of the charging apparatus. The first phase terminates when the output voltage of the charging apparatus reaches a predetermined maximum voltage (e.g., 4.2 volt for a lithium ion cell). Then, in the second charging phase, the output voltage of the charging apparatus being monitored and constant current pulses of fixed duration (e.g., 10 seconds) are supplied to the secondary cell in a manner such that the duration of intervals between such constant current pulses is controlled to maintain an average output voltage of the charging apparatus at a predetermined average voltage (e.g., 4.2 volt for a lithium ion cell). The charging is terminated when the duty cycle of the pulses falls below a predetermined value.

12 Claims, 2 Drawing Sheets

FAST CHARGING METHOD AND APPARATUS FOR SECONDARY CELLS

BACKGROUND OF THE INVENTION

1. Field of the Invention

This invention relates to a method and apparatus for the fast charging of secondary cells such as lithium ion cells.

2. Description of the Invention

Secondary cells, in particular lithium ion cells are sensitive to over-voltage during charging. Any significant rise of the charging voltage above a prescribed maximum charging voltage is likely to reduce the cycle life of the cell.

A charger is used for charging a secondary cell which is installed in an electric appliance. With a remote charger, such as is conventionally used with a portable appliance such as a mobile telephone, it is difficult to measure the cell voltage accurately, because of voltage drops in components connecting the charger to the cell.

Accordingly, it has previously been proposed to operate a remote charger during an initial charging phase at a high level of charging current, whilst monitoring the output voltage of the charger, and to reduce the charging current when the output voltage reaches a predetermined level representing a 70% fully charged condition of the cell. At the reduced charging current, the voltage drops referred to are smaller and a more accurate estimate of the cell voltage is thus available based on the charger output voltage. With this arrangement, charging is made more protracted because of the reduction in the charging current.

SUMMARY OF THE INVENTION

It is the object of the present invention to provide a fast charging method and apparatus for charging secondary cells such as lithium ion cells in which this disadvantage is substantially overcome.

In accordance with one aspect of the invention, there is provided a method of fast charging a secondary cell which comprises a first charging phase of supplying a constant current to the secondary cell from a charging apparatus whilst monitoring an output voltage of the charging apparatus, and terminating the first charging phase when the output voltage of the charging apparatus reaches a predetermined maximum voltage; and a second charging phase in which constant current pulses of fixed duration are supplied to the secondary cell, the output voltage of the charging apparatus being monitored and duration of intervals between such constant current pulses being controlled to maintain an average output voltage of the charging apparatus at a predetermined average voltage.

Charging may be terminated when the duty ratio of the constant current pulses falls below a predetermined level.

In accordance with another aspect of the invention there is provided a charging apparatus for use with a portable appliance having a secondary cell, the charging apparatus comprising a constant current source, a switching device connecting the constant current source to an output connection, means for sensing a voltage at the output connection, and a control device connected to the sensing means and controlling opening and closing of the switching means such that, in a first charging phase the switching device is maintained conductive until the voltage at the output connection reaches a predetermined maximum voltage, and in a second charging phase the switching device is rendered conductive in charging pulses of fixed duration, with an interval between the charging pulses being such that a average voltage at the output connection is maintained at a predetermined average voltage.

In the present invention, the secondary cell is typically a lithium ion cell.

The above and other objects, features and advantages of the present invention will be apparent from the following description referring to the accompanying drawings which illustrate an example of a preferred embodiment of the present invention.

DESCRIPTION OF THE PREFERRED EMBODIMENT

Figure 1:
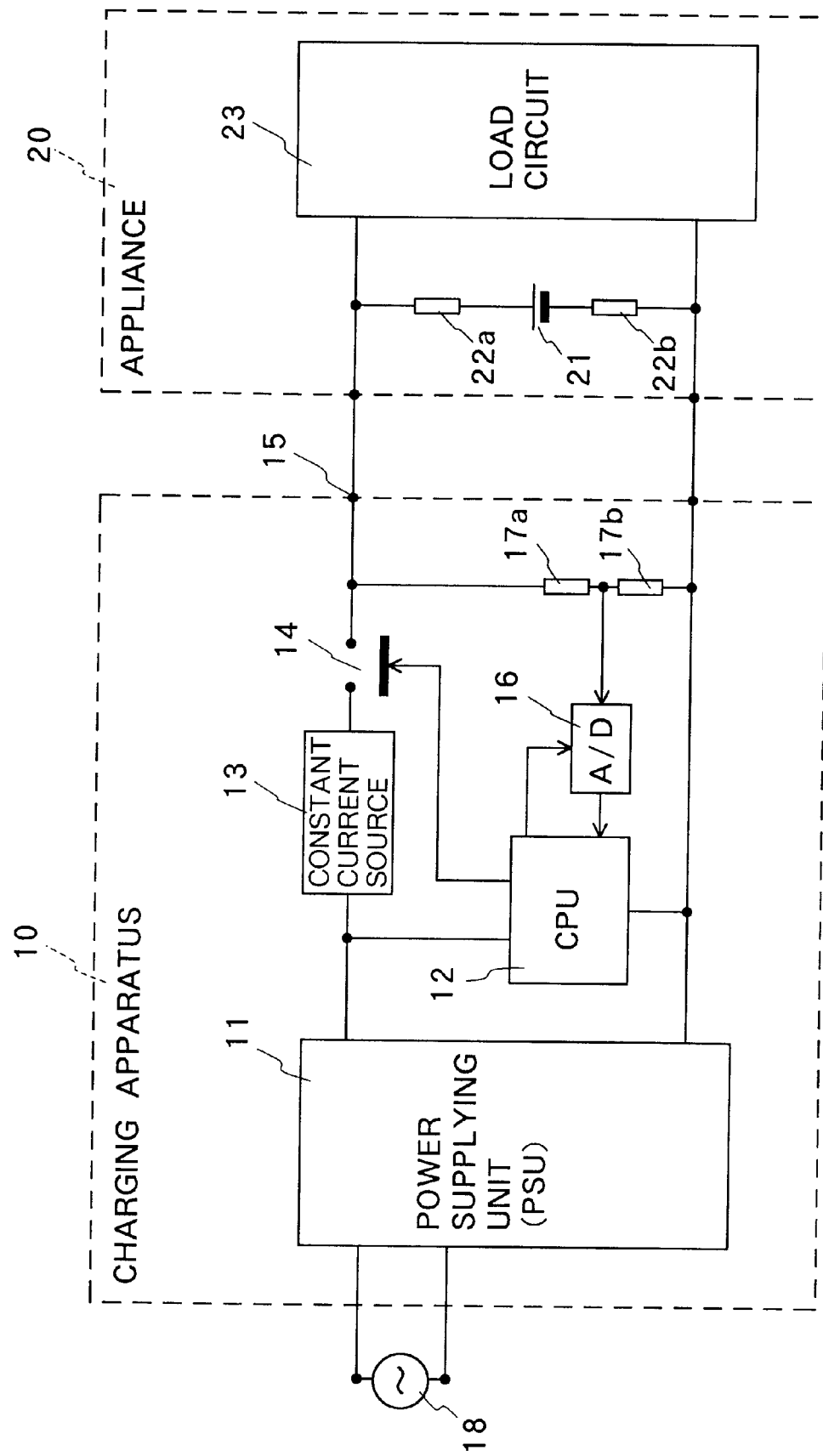
FIG. 1 is a block diagram of one example of a charging apparatus in accordance with the invention.

Referring firstly to FIG. 1, the charging apparatus 10 includes a PSU (power supplying unit) 11 which can be connected to a main supply 18 and provides a reduced voltage to a controller in the form of a CPU (central processing unit) 12 and to a constant current source 13. A switching device 14, preferably in the form of a semiconductor switch such as an FET (field effect transistor), connects the out of the constant current source 12 to an output terminal 15 of the charging apparatus 10.

The switching device 14 is controlled by the CPU 12, which receives an input from an analog-to-digital (A/D) converter 16. The input of A/D converter 16 is connected to a midpoint on a voltage divider resistor chain which has resistors 17a, 17b and is connected to the output terminal 15.

In use, the charging apparatus 10 in connected to a cell powered appliance 20 such as a mobile telephone. As shown in FIG. 1, the appliance 20 includes a lithium ion cell 21 which is shown as having virtual resistors 22a, 22b connected in series with the cell 21. These resistors 22a, 22b represent resistance which occurs in the cell itself and in its connections to the circuitry rather than actual added resistors. The appliance 20 includes a load circuit 23 to which power is supplied from the cell 21.

Figure 2:
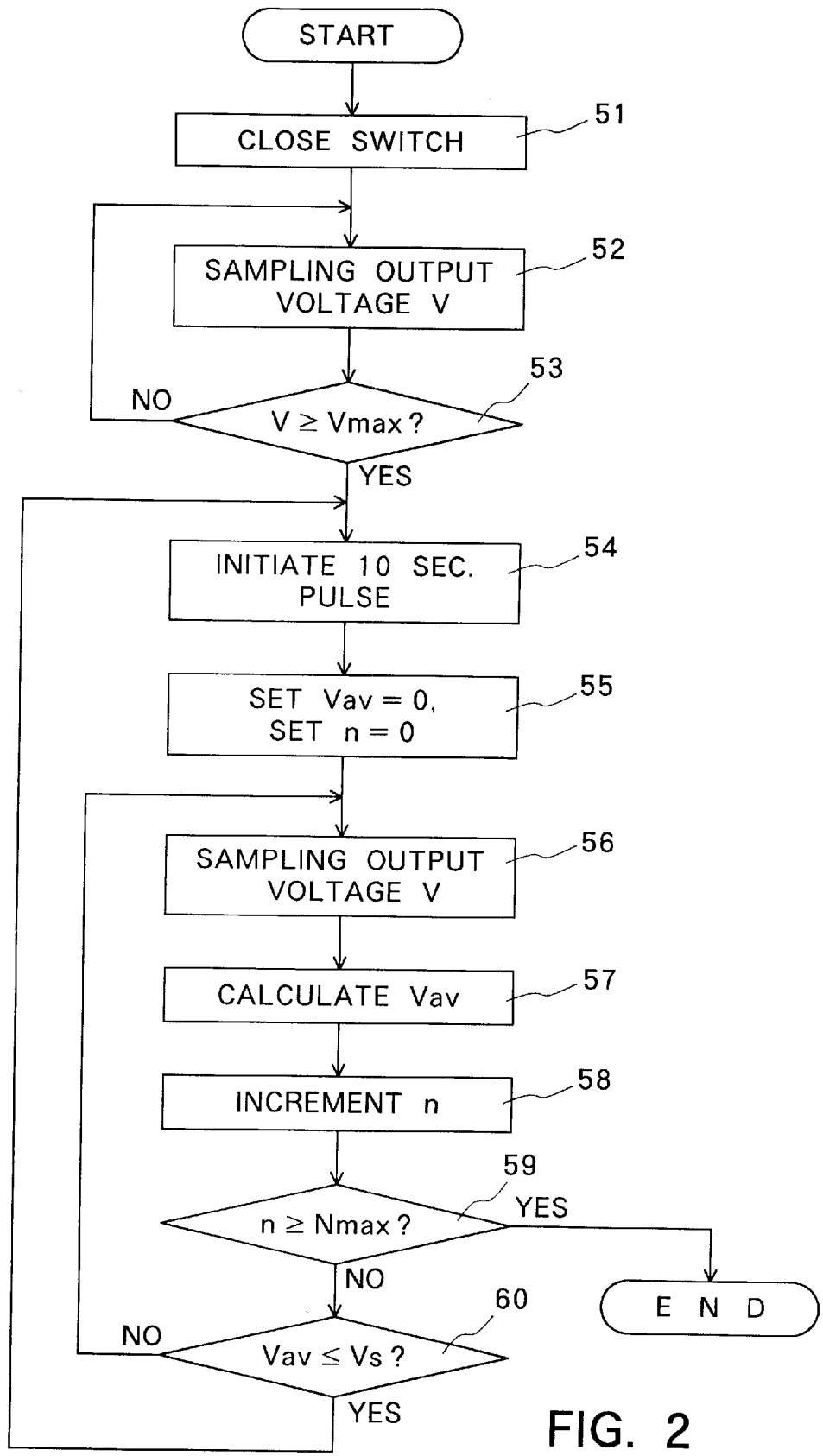
FIG. 2 is a flow chart of a software program used in the apparatus to control charging of a lithium ion cell.

The operation of the charging apparatus is illustrated by the flow chart shown in FIG. 2. The flow chart indicates a software routine executed by the CPU 12.

As shown, when the charging operation is started, the switching device 14 is switched on at step 51 so that a constant charging current of a predetermined value, e.g. about xxx milliampere, starts to flow into the cell 21, and the voltage at the output terminal 15 is monitored by the CPU 12 by periodically inputting the digitized output voltage value V into the CPU 12 from the A/D converter 16 at step 52 and checking it against a maximum voltage value Vmax of about 4.2 volt at step 53. If the output voltage V has not reached this level Vmax, another voltage sample is converted and fed to the CPU 12 by returning to step 52. This loop continues until the output voltage V reaches the maximum value Vmax at step 53. Then, the first phase of charging terminates and a second phase of charging starts.

In the second phase of charging, the switching device 14 is closed and opened repeatedly. The duration of the switch closed interval is fixed at about 10 seconds (although longer or shorter fixed duration pulses may be utilized) so that a constant current pulse of 10 seconds is applied to the cell at step 55. Each time the switching device 14 is closed to in, a count n of the voltage sample periods is restarted at zero and a variable Vav is reset to zero at step 55. Then, the output voltage V is sampled at step 56. After each voltage sample is processed, the CPU 12 calculates, at step 57, the new average voltage Vav at the output terminal 15 since the current pulse cycle commenced by multiplying the existing valve of Vav by n addling the latest sample value V and dividing the result by n+1. The CPU 12 increments the value of n at step 58 and tests whether the value of n has reached a predetermined maximum value Nmax at step 59. If it has not, the CPU 12 compares, at step 60, the value of Vav with a predetermined desired average value Vs, typically also 4.2 volt. If the calculated value Vav is greater than the desired value Vs the routine loops back to the sampling step of step 58. If the value of Vav is less than Vs at step 60 and the pulse duration has expired, the routine loops back to the point, i.e. step 55, at which a new 10 second pulse is initiated.

In the early stages of the second phase of charging, the value of Vav may fail to reach the desired value Vs by the time the pulse ends, in which case, a new 10 second pulse is started immediately. As the cell voltage rises as it nears its fully charged condition, the time taken for the average voltage Vav to fall to Vs will increase, until the cycle length becomes so long that the count n reaches its maximum value Nmax indicating that the duty cycle of the pulses has fallen to such a low level that the cell 21 can be regarded as fully charged. When this occurs and is detected at step 59, the charging operation is terminated.

It is found that the process described above adequately protects the cell from substantial over-voltage damage, whilst permitting full charging to be obtained quickly as compared with the prior art. It is not necessary to include any additional components in the appliance to protect the cell.

It should be noted that during the second phase of charging, proper control is maintained of the charging process even if a load current is drawn by the load circuit 23.

It will be understood that although the example described a single cell is employed in the appliance, the invention is also applicable to the charging of multiple cells connected in series. Further, it is obvious that the fast charging method and apparatus of the present invention can be applied to secondary cells other than lithium ion cells. The voltage values with which the output voltage is compared during the first phase and with which the average output voltage is compared during the second phase would be changed according to the type and the number of cells to be charged.

It is to be understood that variations and modifications of the fast charging method and apparatus disclosed herein will be evident to those skilled in the art. It is intended that all such modifications and variations be included with in the scope of the appended claims.

What is claimed is:

1. A fast charging method for a secondary cell, comprising:
   a first charging phase of supplying a constant current to the secondary cell from a charging apparatus whilst monitoring an output voltage of the charging apparatus, and terminating said first charging phase when the output voltage of the charging apparatus reaches a predetermined maximum voltage; and
   a second charging phase in which constant current pulses of fixed duration are supplied to the secondary cell, the output voltage of the charging apparatus being monitored and duration of intervals between such constant current pulses being controlled to maintain an average output voltage of the charging apparatus at a predetermined average voltage.

2. The method according to claim 1 wherein the duration of each interval between the constant current pulses is determined by terminating such interval when the average voltage, since commencement of a preceding constant current pulse becomes equal to or less than said predetermined average voltage.

3. The method according to claim 2 wherein the secondary cell is a lithium ion cell.

4. The method according to claim 1 wherein charging is terminated when a duty cycle of the constant current pulses falls below a predetermined value.

5. The method according to claim 2 wherein charging is terminated when a duty cycle of the constant current pulses falls below a predetermined value.

6. The method according to claim 5 wherein the secondary cell is a lithium ion cell.

7. The method according to claim 6 wherein the predetermined maximum voltage is about 4.2 volt.

8. The method according to claim 6 wherein the predetermined average voltage is about 4.2 volt.

9. A charging apparatus for use with a portable appliance having a secondary cell, said charging apparatus comprising:
   a constant current source;
   a switching device connecting the constant current source to an output connection;
   means for sensing a voltage at the output connection; and
   a control device connected to said sensing means and controlling opening and closing of said switching device such that, in a first charging phase said switching device is maintained conductive until the voltage at the output connection reaches a predetermined maximum voltage, and in a second charging phase the switching device is rendered conductive in charging pulses of fixed duration, with an interval between the charging pulses being such that a average voltage at the output connection is maintained at a predetermined average voltage.

10. The charging apparatus according to claim 9 wherein said control device is arranged to maintain a cumulative average value of the output voltage from a beginning of each charging pulse and to terminate a variable interval between the charging pulses when the cumulative average value becomes less than or equal to said predetermined average voltage.

11. The charging apparatus according to claim 10 wherein the secondary cell is a lithium ion cell.

12. The charging apparatus according to claim 10 wherein charging is terminated when a duty cycle of the charging pulses falls below a predetermined value.

* * * * *